June 28, 1932. H. L. WALKER 1,864,565
SCALE
Filed May 14, 1929
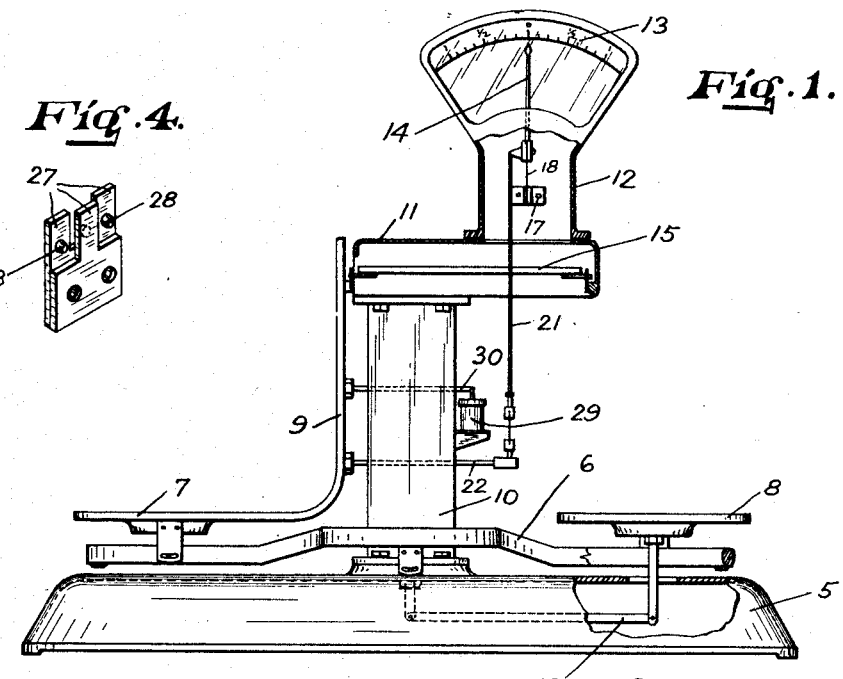
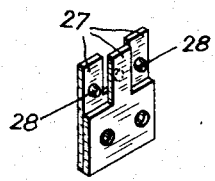
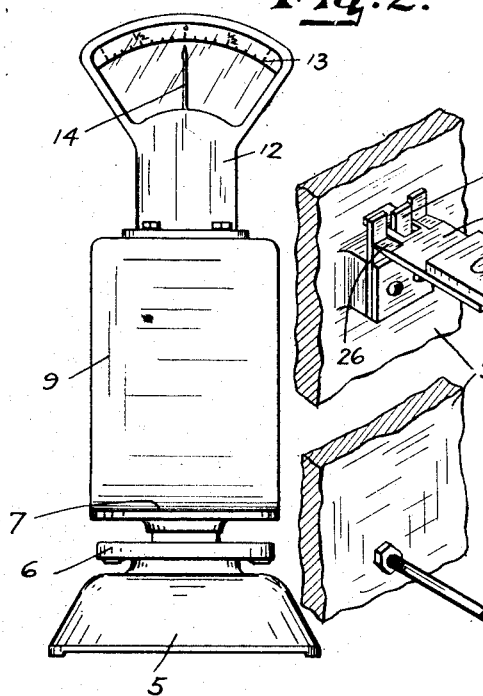
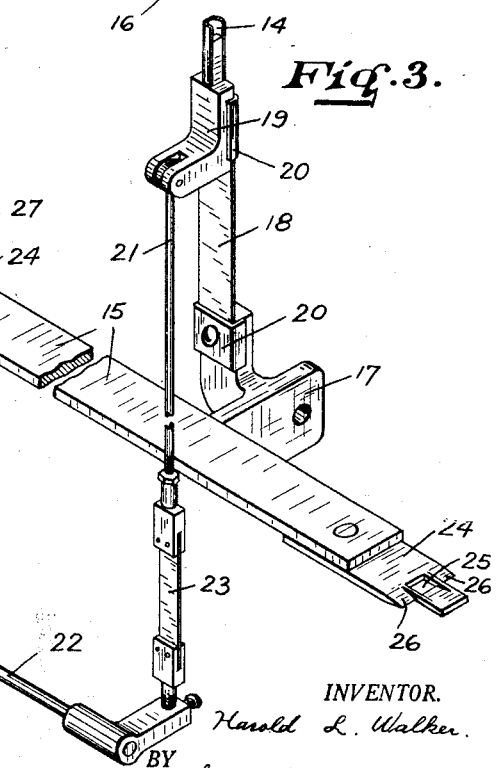
INVENTOR.
Harold L. Walker.
BY
ATTORNEYS.

Patented June 28, 1932

1,864,565

UNITED STATES PATENT OFFICE

HAROLD L. WALKER, OF BROOKLYN, NEW YORK, ASSIGNOR TO THE JACOBS BROS. CO. INC., A CORPORATION OF NEW YORK

SCALE

Application filed May 14, 1929. Serial No. 362,957.

This invention relates to an improved scale and aims to provide a device of this character capable of use in numerous different associations but of particular value when employed in the weighing of relatively heavy bodies.

It is an object of the invention to furnish an apparatus of this character, the parts of which will be few in number and individually simple and rugged in construction, these parts being capable of being manufactured at a nominal figure and assembled by relatively unskilled labor, to furnish a scale capable of being sold at a comparatively nominal figure and operating over long periods of time with freedom from mechanical difficulties.

A further object of the invention is that of constructing a scale of the over- and under-weight type, i. e. an apparatus in which relatively minute deflections of the mechanism from a balanced condition will be indicated in such a manner as to be readily apparent and in which the over- and under-weight thus indicated will be given to proper valuation by an operator.

It is a further object to provide a check rod structure presenting improved functional and structural characteristics and capable of use in numerous different associations.

Among other advantages of the present scale are those of construction an apparatus, the parts of which may be quickly "set up" and which does not necessarily have to occupy a true horizontal surface to assure accuracy of operation.

With these and other objects in mind, reference is had to the attached sheet of drawing illustrating practical embodiments of the invention, and in which:

Fig. 1 is a partly fragmentary side elevation of a scale;

Fig. 2 is an end view thereof but showing the registering mechanism as being of the "cross-tower" type; and Figs. 3 and 4 are perspective views of the operating mechanism.

In these views, the numeral 5 indicates the scale base upon which there is rockingly mounted by means of the usual bearings, a beam 6 carrying at its outer ends pans 7 and 8, the former preferably having a rear wall 9 and being adapted to receive the goods to be weighed and the latter being primarily intended to receive weights to counter-balance the weight of the object placed upon the pan 7.

Extending upwardly from the base is a column 10 which supports at its upper end a casing 11 in turn mounting a housing 12 presenting an opening within which a dial 13 is visible. The indicia of this dial is traversed by a pointer 14 and with a view to adequately supporting the pans, it will be observed that in the present exemplification a two-part check rod is employed including an element 15 disposed within the casing 11 and connected to the pan 7. The second element 16 of this rod is disposed within the base 5 and secured at one of its ends to the pan 8, its opposite end being rockingly attached to the scale base. At this time, it will be observed that while the casing 12 as shown in Fig. 1 is positioned to have the registering mechanism visible from the side of the scale that this casing together with the registering mechanism might be shifted axially through 90 degrees to occupy the positions shown in Fig. 2.

In any event, and with a view to normally maintaining the even balanced condition of the beam, the housing in the present instance mounts a bracket 17 to which the lower end of a flexion strip 18 is attached, the upper end thereof being in turn secured to a bracket 19. The resistance to deflection offered by the strip 18 may be varied by shortening or lengthening its effective body, this being accomplished by means of clamping plates 20, or any other desirable structure, which has been described in detail in connection with preceding applications for patent. The bracket 19 mounts the pointer 14 and may be connected by a link 21 or otherwise to the pan 7. This connection preferably includes a rod 22 extending from the rear face of the wall 9 of this pan and adjustably carrying a second flexion strip 23, the upper end of which is likewise connected to the link 21. The element 15 of the check rod assembly includes a main body which may have its ends extended or, as shown, have secured to these ends plates 24. It is desirable to resort to the latter expedient in view of the fact that these portions should be formed of a metal providing a suitable bearing surface which metal is relatively expensive so that costs in connection with the use of the plates are reduced without detriment to the effective operation of the scale. Each of these plates may be formed with an opening 25 which presents at its forward end a knife edge bearing portion and corresponding portions are formed in the shoulders 26.

The end of the housing 11 as well as the upper end of the wall 9 carry three parallel prongs or tongues 27, the two side tongues bearing respectively one against each of the edges 26 and the central tongue bearing against the forward edge of the opening 25. As a result bearing surfaces are reduced to a minimum and thus friction is avoided. Moreover, and as has been shown in Fig. 4, it will be perceived that the tongues 27 may present abutments or extensions 28 between which the ends of the bar or the plates 24 ride, it being thus apparent that displacement of the bar is prevented.

Finally, it will be noted that a dash-pot 29 may be carried by the standard 10 and the plunger of this pot is connected by a bar or rod 30 to the rear wall of the pan 7. As a consequence, the action of the scale will be dampened, it being finally appreciated that the dash-pot assembly including the rod 30 and the units connecting the registering mechanism with the scale might be effectively concealed from view and against damage by means of a suitable housing (not shown).

From the foregoing, it will be appreciated that among others, those objects which have been specifically aforementioned are achieved. It will, moreover, be understood that numerous changes in construction and rearrangements of the parts might be resorted to without departing from the spirit of the invention as defined by the claims.

Having described my invention, what I claim as new and desire to secure by Letters Patent, is:

1. A scale including a rockingly mounted beam, a plurality of check rods including an element pivotally mounted at one of its ends and pivotally associated with one end of the beam at its opposite end, and a second element arranged above said beam and associated therewith at one end, and means for rockingly supporting the opposite end of said latter element.

2. A scale including a rockingly mounted beam, a base for supporting the same, pans associated with said beam, a mounting member extending above said beam, a plurality of check rods including one element positioned above said beam and having one of its ends rockingly secured to said mounting member, its opposite end being rockingly connected to one of said pans, and a second element forming a part of said check rod and having one of its ends connected to the second pan, its opposite end being rockingly mounted by said base.

3. A scale including a rockingly mounted beam, a support extending above the same, a pan mounted by said beam, and a dash pot associated with said support and connected to said pan.

4. A scale including a base, a beam rockingly supported thereby, pans associated with the ends of said beam, a support extending from said base and above said beam, a stabilizing element mounted at one end by said support, its opposite end being connected to one of the pans associated with said beam, and a second stabilizing element connected to the second pan and to said base.

5. A scale including a base, a support extending therefrom, a beam rockingly mounted by said base, a casing associated with said support and above said beam, a stabilizing element having one of its ends connected to one of said pans, its body being disposed within said casing and its opposite end being rockingly secured thereto, and a second stabilizing element having one of its ends rockingly connected to said base, its opposite end being rockingly secured to the second pan.

6. A scale including a rockingly mounted beam, a pan associated therewith, a check rod, means for rockingly mounting the outer end of said check rod, and means for rockingly connecting the inner end thereof to said pan, the body of said rod extending to both sides of the plane of rocking mounting of said beam.

7. A scale including a rockingly mounted beam, a pan supported by said beam, a rear wall forming a part of said pan, a check rod rockingly attached to said rear wall at one of its ends, and means for mounting the opposite end of said check rod.

8. A scale including, in combination, a base, a beam rockingly supported thereby, a mounting structure extending above said base, pans associated with said beam, a registering mechanism associated with said mounting structure, means extending from one of said pans to connect with said registering mechanism, a check rod also associated with said mounting structure and having one of its ends rockingly supported thereby, its opposite end being connected to one of said pans and a second check rod connected to the second pan and said base respectively.

9. A scale including, in combination, a base, a beam rockingly supported thereon, a housing member secured to said base and extending above the same and substantially centrally of said beam, a pan associated with one of the beam ends, a dash-pot carried by said housing member, and means extending from said pan and connected to said dash-pot to dampen the movements of the beam.

In testimony whereof I affix my signature.

HAROLD L. WALKER.